(No Model.)  F. H. RICHARDS.  6 Sheets—Sheet 1.
WEIGHING MACHINE.

No. 573,419.  Patented Dec. 15, 1896.

Witnesses:  Inventor:
Chas. D. King.  F. H. Richards.
Fred. J. Dole.

(No Model.) 6 Sheets—Sheet 2.

F. H. RICHARDS.
WEIGHING MACHINE.

No. 573,419. Patented Dec. 15, 1896.

Witnesses:
Chas. D. King.
Fred. J. Dole.

Inventor:
F.H.Richards (No Model.)  6 Sheets—Sheet 3.

F. H. RICHARDS.
WEIGHING MACHINE.

No. 573,419.  Patented Dec. 15, 1896.

Witnesses:
Chas. D. King.
Fred. J. Dole.

Inventor:
F. H. Richards.

(No Model.) 6 Sheets—Sheet 5.

F. H. RICHARDS.
WEIGHING MACHINE.

No. 573,419. Patented Dec. 15, 1896.

Witnesses:
Chas. D. King.
Fred. J. Dole.

Inventor:
F. H. Richards.

(No Model.)  6 Sheets—Sheet 6.

F. H. RICHARDS.
WEIGHING MACHINE.

No. 573,419.  Patented Dec. 15, 1896.

Witnesses:
Chas. D. King.
Fred. J. Dole.

Inventor:
F. H. Richards.

UNITED STATES PATENT OFFICE.

FRANCIS H. RICHARDS, OF HARTFORD, CONNECTICUT.

WEIGHING-MACHINE.

SPECIFICATION forming part of Letters Patent No. 573,419, dated December 15, 1896.

Application filed June 10, 1896. Serial No. 595,014. (No model.)

*To all whom it may concern:*

Be it known that I, FRANCIS H. RICHARDS, a citizen of the United States, residing at Hartford, in the county of Hartford and State of Connecticut, have invented certain new and useful Improvements in Weighing-Machines, of which the following is a specification.

This invention relates to weighing-machines, an object of the invention being to provide improved means for maintaining an even flow of the supply-stream to the bucket of the machine during the loading period, said means being especially applicable to machines for weighing sluggish or slow-running substances—such as cotton-seed meal, coffee, and the like.

Another object is to furnish, in connection with a bucket and a load-discharge controller therefor, a scale-beam in operative relation with said bucket, said scale-beam having means for limiting the action of the load-discharge controller, whereby the efficiency of the machine will be materially increased.

Figure 1:
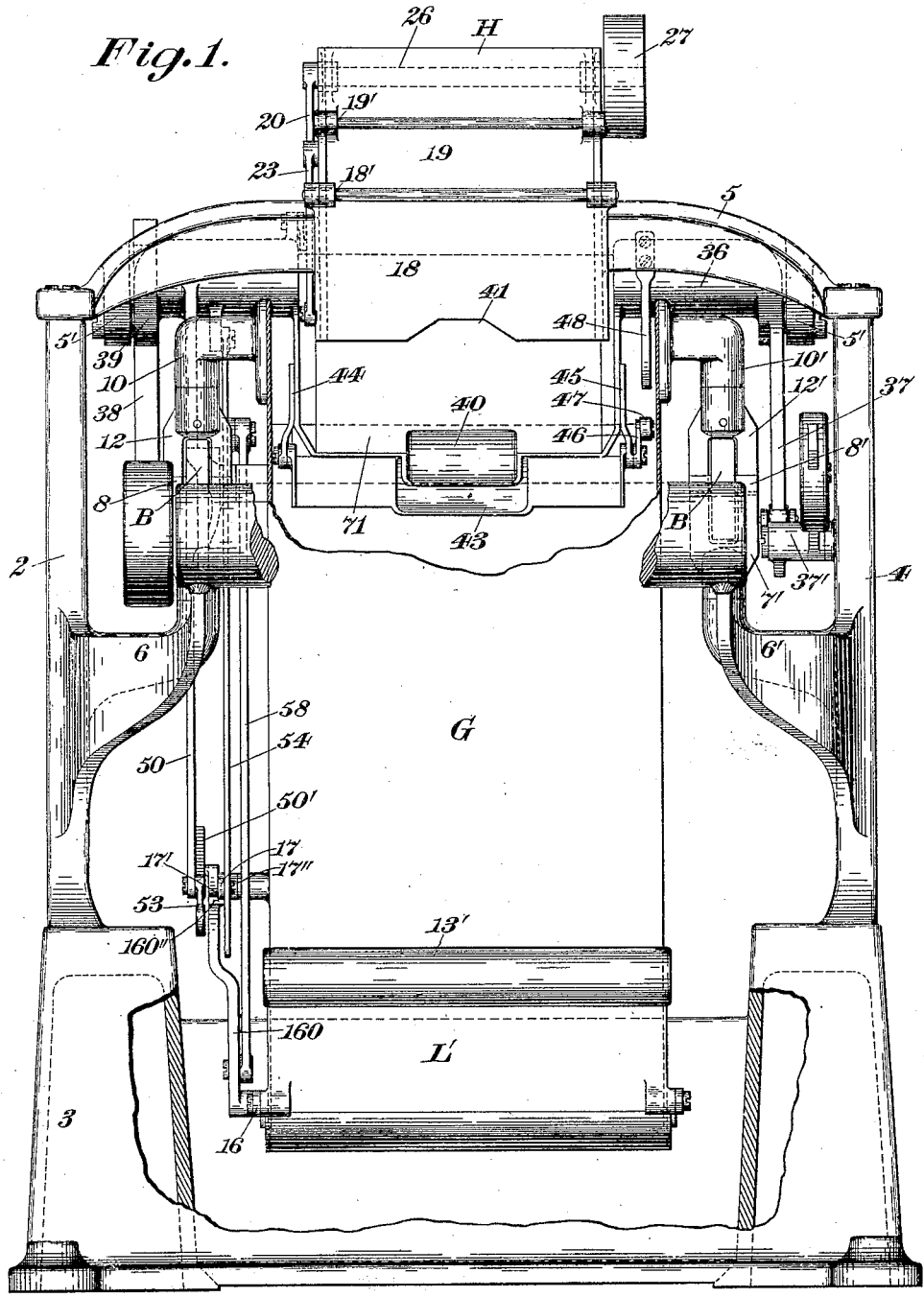
Figure 2:
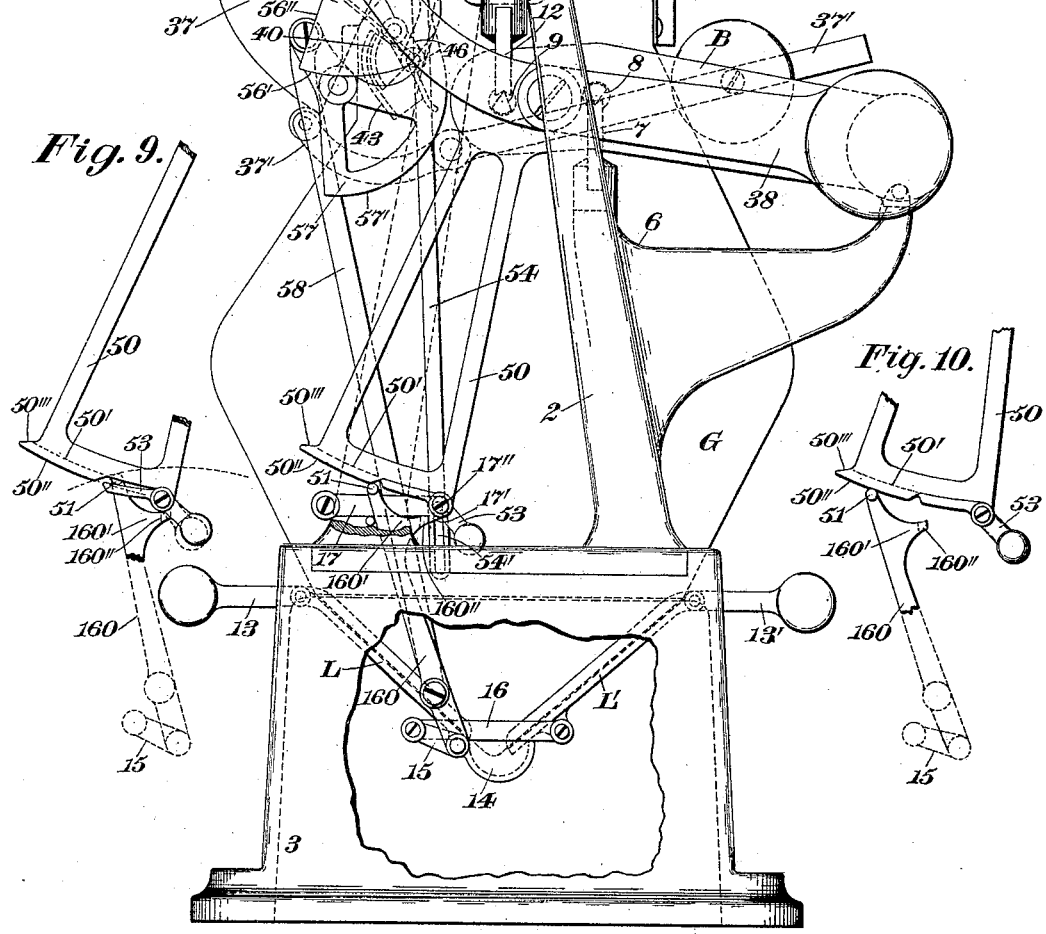
Figure 3:
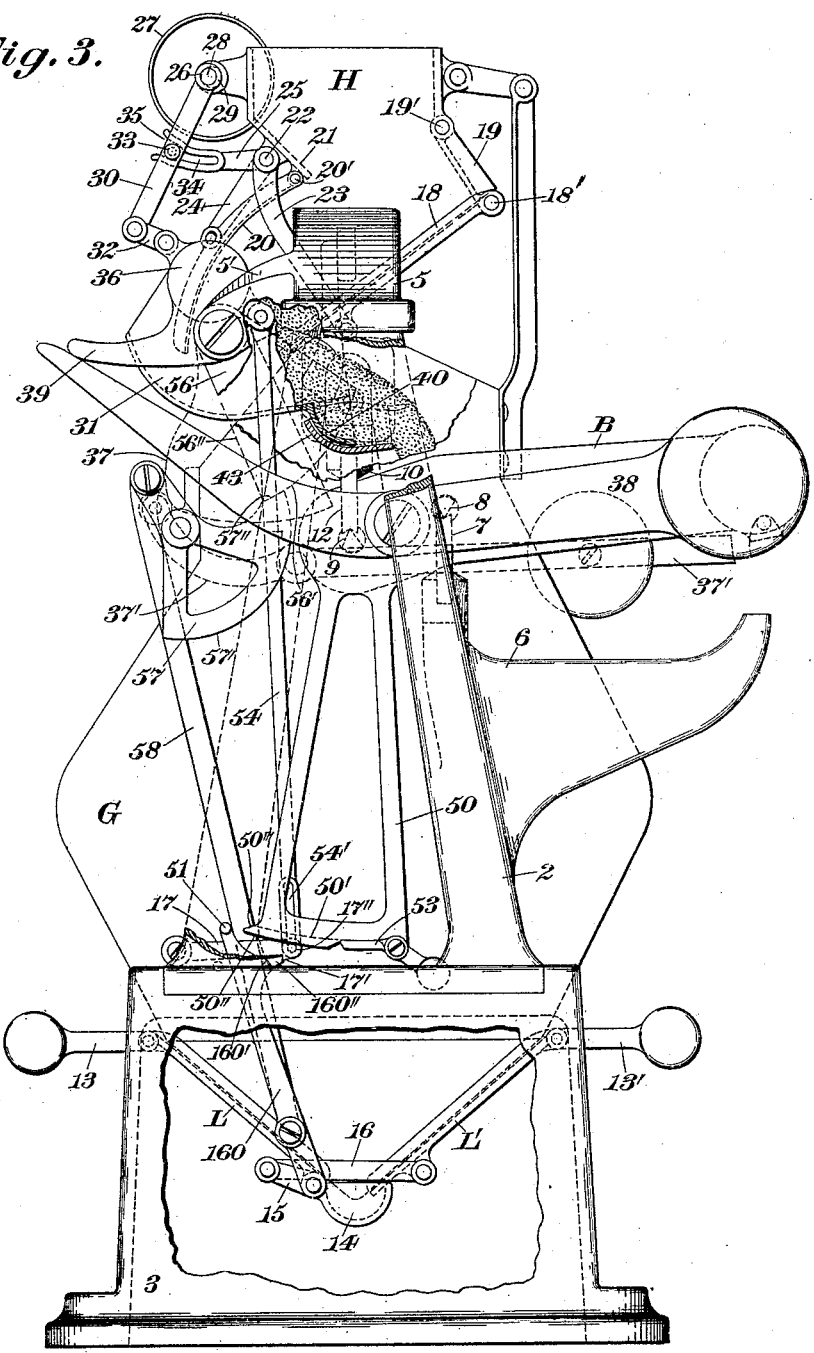
Figure 4:
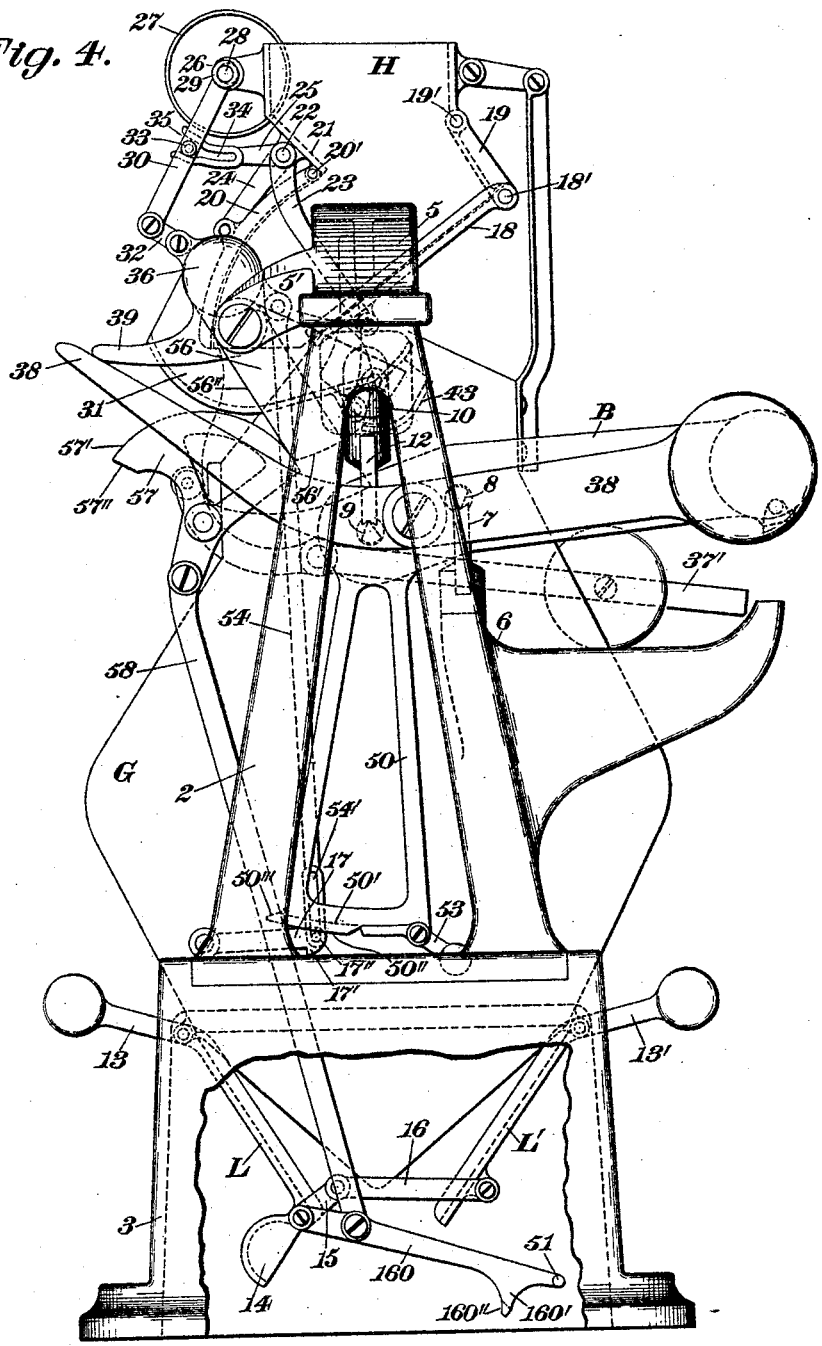
Figure 5:
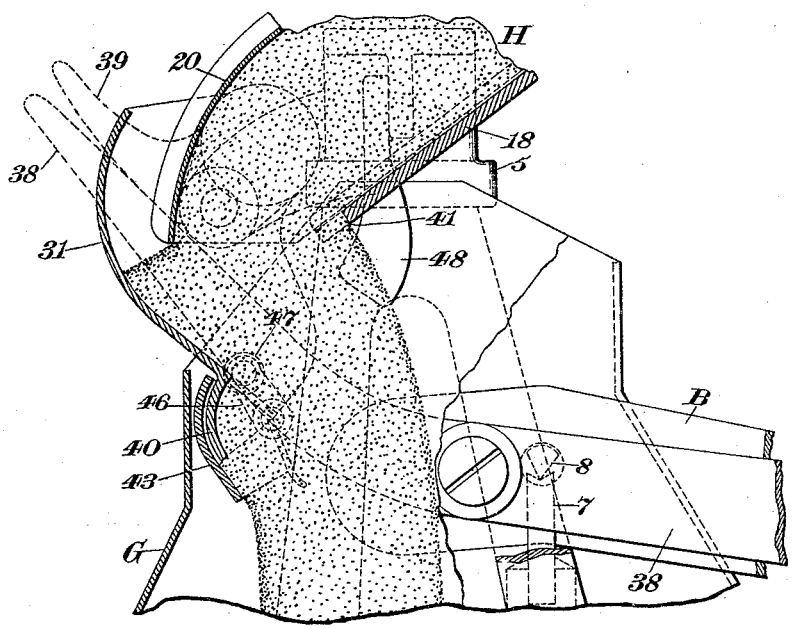
Figure 6:
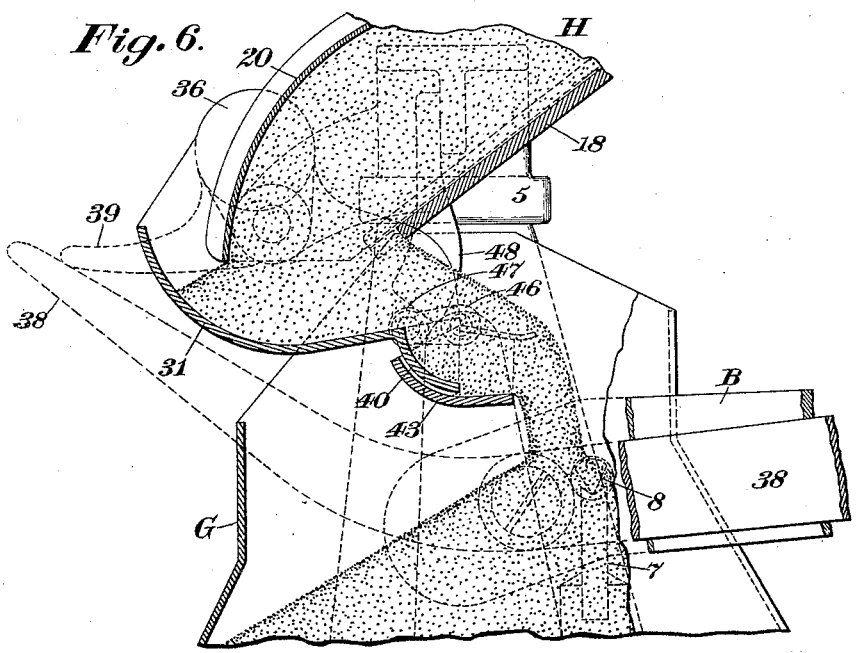
Figure 7:
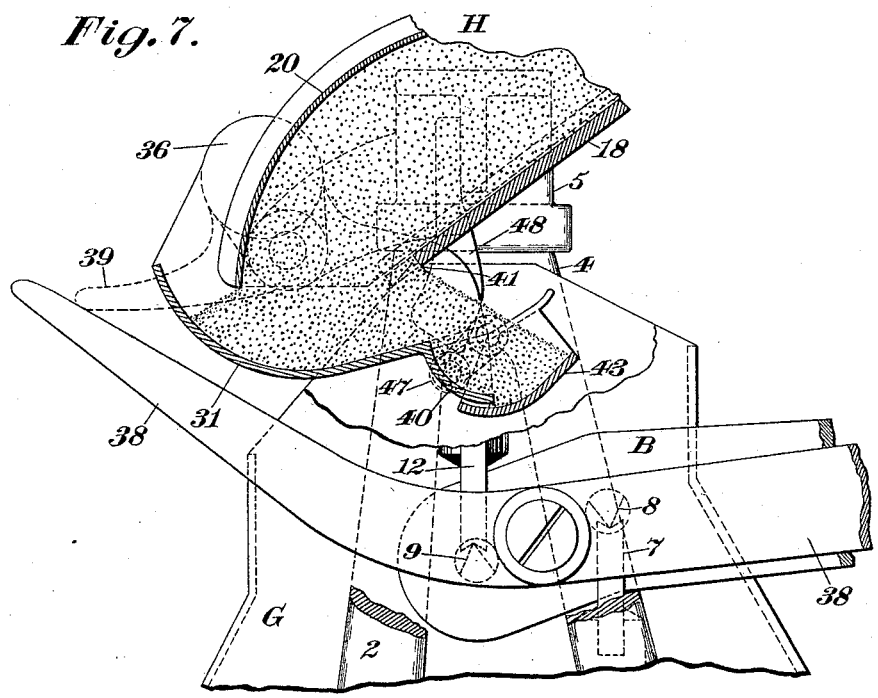
Figure 8:
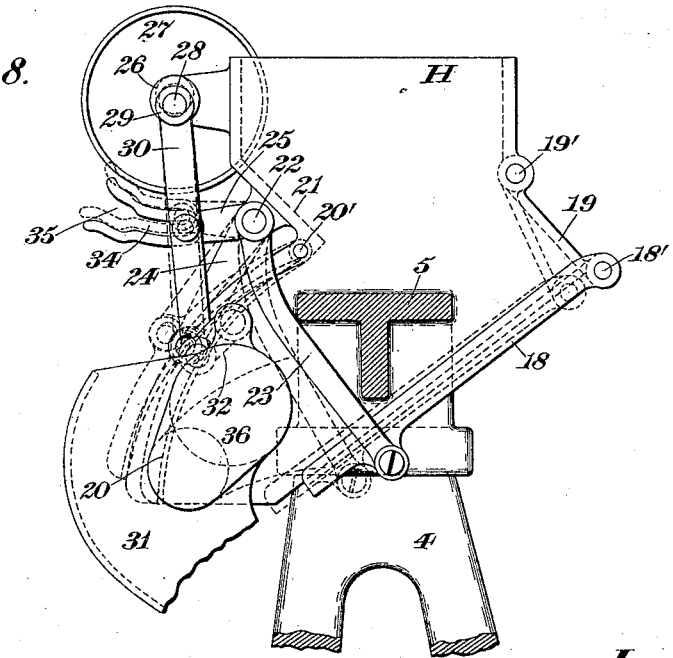

In the drawings accompanying and forming part of this specification, Figure 1 is a front elevation of a weighing-machine comprehending my improvements in the preferred embodiment thereof, the various operative parts being shown in the positions they occupy at the commencement of operation. Fig. 2 is an end elevation of the machine as seen from the left in Fig. 1, the parts being in positions corresponding therewith. Figs. 3 and 4 are similar views to Fig. 2 and illustrate two succeeding stages in the operation of the machine. Figs. 5, 6, and 7 are detail views of the valve mechanism, the chute, and a fragment of the bucket, the valve mechanism being shown in central vertical section and in positions corresponding, respectively, with Figs. 2, 3, and 4. Fig. 8 is a detail view of the chute and valve mechanism in left-hand end elevation, illustrating by full and dotted lines the peculiar action of the chute. Figs. 9 and 10 are detail views hereinafter more particularly described.

Similar characters designate like parts in all the figures of the drawings.

The framework for supporting the operative parts of the machine may be of any suitable character, and it is herein illustrated comprising the side frames or columns 2 and 4, mounted upon the chambered supporting-base 3 and connected at the top by the plate or beam 5, to which latter is suitably fixed the chute or hopper H, hereinafter more particularly described. The side frames 2 and 4 have formed thereon the brackets 6 and 6', respectively, to which beam-supports, herein illustrated as V-shaped bearings 7 and 7', are attached.

As a means for supporting the bucket, the counterweighted scale-beam B is herein illustrated, the arms thereof being equipped with the pivots or knife-edges 8 and 8', resting on the V-shaped bearings 7 and 7'.

The scale-beam B, at points preferably near the inner end thereof, will carry bucket-supports, herein shown as pivots or knife-edges 9, for sustaining the bucket mechanism, consisting of the bucket, which is designated by G, and its operative devices. The bucket G is shown having the brackets 10 and 10' near the upper edge thereof, to which are suitably connected the V-shaped bearings 12 and 12', resting on the V-shaped bearings 9, to which reference has been hereinbefore made.

The bucket G is illustrated as being angular in vertical section, the front and rear walls thereof sloping toward or terminating at a point, and is also provided with two closers L and L', preferably operatively connected. The closers L and L' will preferably consist of flat plates having upturned end flanges and will be also pivotally supported at opposite sides of the discharge outlet or opening of the bucket. The closers L and L' are also shown having attached thereto the counterweighted arms 13 and 13', the office of said arms being to return the closers to the normal or shut position thereof on the discharge of a bucket-load, as indicated in Figs. 2 and 3. The closer L is illustrated pivotally carrying adjacent to the discharge edge thereof the cup-shaped or concaved valve 14, which closes over the space between the two closers when the latter are in the normal positions thereof, so that at this point a wasteproof joint is provided.

The valve 14 is illustrated having the rock-arm 15, which constitutes one member of a toggle, the other member thereof being shown as the link 16, which is pivotally connected to said rock-arm and to the closer L' at a point near the discharge edge thereof. The action of these parts is as follows: On the opening of the closers by the weight of the mass in the bucket they will be forced outward and in unison, which will tend to throw the three toggle-pivots into line and concurrently therewith rock the valve 14 outward and away from the line of flow of the discharging stream of material from the bucket, as indicated in Fig. 4. When the discharged mass has passed below the lips of the closers L and L', these are free to be shut by the counterweighted arms 13 and 13', so that the action just described will be reversed and the valve 14 swung upward into its effective position. (Shown in Figs. 2 and 3.)

As a means for maintaining the closers L and L' in the normal positions thereof the following-described instrumentalities may be employed: The pivot of the valve 14 is illustrated having attached thereto the rod 160, provided with a projecting portion 160', furnished with a detent 160'', which is in position to be engaged by a latch 17 when the parts are in the closed position previously described, said latch having a detent 17', adapted to engage the coöperating detent 160'' of the rod 160.

At the proper point in the operation of the machine or when the latch 17 is raised the closers L and L' are free of all restraint and may be instantly forced open or outward by the weight of the mass in the bucket G.

My present machine embodies, in connection with a reciprocatory member thereof, a fixed chute having a movable wall and a pulsator for said wall controlled in its action by said reciprocatory member. The front wall 18 of the chute is shown inclined and supported for longitudinal reciprocatory movement, it being illustrated pivoted at 18' to the chute-section 19, which in turn is pivoted at 19' to the chute H. The rear curved wall 20 of the chute is supported for lateral movement, it being pivotally connected at 20' to the chute-wall 21, whereby on the movement of the walls 18 and 20 the mass contained within the chute will be thoroughly loosened up, and an even supply of the material to the bucket will be insured.

As a means for imparting pulsatory or vibratory movements to the walls 18 and 20 the following-described mechanism may be employed: The chute H is shown supporting the rock-shaft 22, to which is attached the arm 23, the opposite end of said arm being pivotally connected to the chute-wall 18. Said rock-shaft 22 is also illustrated carrying a second rock-arm 24, likewise connected to the chute-wall 20, so that on the movement of said shaft 22 the two chute-walls 18 and 20 will be reciprocated in an obvious manner. The shaft 22 is also shown having rigidly attached thereto the bifurcated lever 25, constituting a pulsator, between the walls of the bifurcation of which a suitable device has a working stroke, whereby the same may be transmitted to the two walls 18 and 20 of the chute, as hereinbefore specified, the slot in said pulsator being of differential width.

The chute H is shown supporting the power or drive shaft 26, having keyed or otherwise suitably connected thereto the pulley 27 and which may be suitably driven by a motor, (not shown,) said shaft being journaled in brackets formed on said chute.

The shaft 26 terminates in a crank 28, which is embraced by the ring 29 of a connecting-rod 30, the latter being operatively connected with the valve 31 by means of the relatively short link 32, pivoted, respectively, to said valve and to said rod 30. The rod 30 is shown having passed therethrough the pin or stud 33, which has a movement between the walls of the slot 34 of the lever 25, said slot being shown widened at 35. On the rotation of the shaft 26, and when said pin is in the narrow portion of the slot 34, it will be evident that a vertical reciprocatory movement will be transmitted to the lever 25 and such movement in turn communicated to the chute-walls 18 and 20 for shaking up the mass in the chute H. It will be evident that as the rod 30 is swung rearward the pin 33 will be moved therewith, so that it is between the walls of the relatively wide portion 35 of the slot 34, the result being a throwing of the pulsator or lever 25 out of action, and hence a stoppage of the connected parts; and when the rod is oppositely moved the consequence will be a restoration to action of said pulsator 25 and a movement of the chute-walls 18 and 20, the valve 31 constituting a convenient means for controlling the movement of the pulsator 25 or for throwing the same into and out of action.

The valve 31 is of the type disclosed in Letters Patent No. 535,727, granted to me March 12, 1895, to which reference may be had, it being pivotally supported for oscillatory movement between the arms or brackets 5', depending from the top plate 5, said valve having a cut-off movement beneath the mouth or supply-outlet of the chute H. The valve 31 acts as a "balanced" valve when in its closed position, the device 36, consisting of weighted arms extending laterally from the end walls of the valve, being shown for this purpose.

For closing the valve mechanism similar in construction and mode of operation to that covered in Patent No. 548,843, granted to me October 29, 1895, is illustrated, to which patent reference may be had, said mechanism comprising a cam 37, operative with said valve and a suitably-supported valve-closing lever 37', adapted to travel along the working face of said cam in the manner disclosed in said patent. On the cut-off movement or oscillation of the valve 31 the balance-weight 36 will be swung rearward, the latter slowly moving the rod 30 in a corresponding direction to effect a peculiar result hereinafter specified.

As a means for actuating the valve to open the same the following-described mechanism may be employed: The scale-beam B is illustrated pivotally carrying at a point near the inner end thereof the counterweighted lever 38, which constitutes a valve-opening actutor, the counterweight of which is normally added to the counterpoised side of said beam, the non-counterweighted arm of said lever being shown extended and in contact with the working face of the cam 39, projecting rearward from and connected to the valve 31, so that on the descent of the scale-beam with the bucket G said extended arm may descend in unison therewith, and falling from under the cam 39 permit the closing movement of the valve 31 by the counterweighted lever 37'.

At a predetermined point in the operation of the machine the lever 38 is oscillated about its pivot and on the return thereof to its normal position an upward thrust will be imparted thereby to the cam 39 sufficient for causing the opening of the valve 31 and the flow of the supply-stream into the bucket.

The discharge edge of the valve 31 is shown intersected by a depression or concavity 40, the peculiar purpose of which will now be described. The front wall 18 of the chute H is shown having formed therein midway and adjacent to the lower edge thereof a drip-opening 41 of suitable shape and size, through which at a predetermined point in the closing movement of the valve 31 a drip-stream of material may flow over said valve and between the end walls of the concavity 40, said stream being discharged into the bucket for the purpose of completing the partial load therein. On the further closing movement of the valve 31 this drip-stream will be cut off thereby.

It is desirable to catch the drizzle or spray which drops from the valve 31 on the final closing movement thereof, and for this purpose the supplemental valve 43 is illustrated, said supplemental valve being preferably supported adjacent to the concavity 40 and having a movement across the line of flow of the drip-stream. The valve 31 is shown having attached thereto the brackets 44 and 45, between and to which the supplemental valve 43 is pivotally supported, said supplemental valve having projecting trunnions journaled in said brackets, one of which carries the crank-arm 46. The crank-arm 46 is furnished with the antifriction-roll 47, which has a movement into engagement with the working surface of the cam 48, attached to and depending from the top plate 5 of the machine, so that when the roll 47 is carried into contact with said cam on the closing movement of the valve 31 the upward oscillation of the valve 43 may be effected, the purpose being, as hereinbefore specified, to catch the drizzle or spray which drops from the cut-off valve 31.

My present invention involves, in connection with a bucket and a load-discharge controller therefor, a scale-beam in operative relation with said bucket, said scale-beam having means for limiting the action of said load-discharge controller.

The closer-supporting rod 160, to which reference has been hereinbefore made, is shown constituting a load-discharge controller, the scale-beam B being furnished with means for limiting or arresting the movement of said rod during the loading period, provided the latch 17 should be prematurely tripped, and until said beam has reached a certain position in its movement.

The scale-beam B is shown having the downward extension 50, serving as a stop device and provided at the lower edge thereof with the inwardly-projecting flange 50', the working face 50'' of which is curved.

The rod 160, to which reference has been made, is shown provided with an outwardly-projecting pin 51, which is adapted, during the loading period of the machine, to run in contact, or approximately in contact, with the curved face 50'' of the stop device 50, so that should the latch 17 be prematurely raised the oscillatory movement of the rod 160 will be positively blocked, the pressure of said rod—should such a contingency as that pointed out arise—being directed against the stop device 50, and hence to the bucket.

As the bucket and beam descend, the stop device 50 will have an inward movement from the position shown in Fig. 2 to that indicated in Fig. 4, the beam having reached the limit of its descending movement in said last-mentioned figure, so that the pin 51 will have passed out of contact with the curved face 50'', and, providing the latch 17 has been tripped, it may ride over and past the face 50'' of the flange 50', whereby the opening movement of the closers L and L', respectively, may be permitted.

As a means for permitting the return of the rod 160 to its normal position, as indicated in Fig. 2, the stop device 50 is shown carrying a by-pass lever 53, pivotally supported at one corner thereof and normally maintained in its effective position by means of a counterweight of proper efficiency. When the rod 160 has nearly reached its normal position, the pin 51 will engage and depress the non-counterweighted arm of the by-pass lever 53, following the arc shown by the dotted line, (see Fig. 9;) and subsequent to this action the by-pass will resume its normal position, the rod 160 continuing in its movement until the pin 51 is in contact with the curved face 50'' of the stop device 50.

It will be remembered that a latch 17 has been described as normally operative for maintaining the closers L and L' against opening movement by engaging a coacting detent 160'', formed on the closer-rod, and that said latch is adapted to be raised for releasing the two closers. This latch will be preferably operatively connected with the oscillating valve 31, so that when the latter has reached a predetermined point in its closing movement it is operable by means of a proper connection for raising said latch to effect the release of the two closers L and L', as will be obvious.

A rod is shown at 54, pivotally connected to the valve 31 and having an upward thrust on the final closing movement of said valve, the lower end of said rod being in sliding relation with the bucket-latch 17. Said rod is shown having formed at its lower end a longitudinal slot 54', which is adapted to embrace the pin or stud 17'', projecting from said latch. At the commencement of operation the upper short wall of the slot 54' will be approximately in engagement with the pin 17'', as shown in Fig. 2, and on the closing oscillation of the valve this rod will be slowly raised concurrently therewith until the lower short wall of the slot comes in contact with said pin, and on the continuation of such movement the latch 17 will be raised and by the power of the closing-valve 31.

My present invention contemplates the provision of reciprocally-effective stops operative, respectively, with a valve and with a closer, each of said stops constituting a stop device for the other.

The valve-operative stop is shown at 56 as a segmental blade suitably attached to and operative with the valve 31, the coacting stop being also segmental and designated by 57, it being operatively connected with the closers L and L', a rod 58, pivotally attached to the member 57 and the closer-supporting rod 160, being herein ilustrated for this purpose. The stop device 56 is shown having the curved and straight stop-faces 56' and 56'', respectively, the companion stop device 57 being similarly equipped, the stop-faces thereof being designated by 57' and 57''. The action of these coacting members will be readily understood from an inspection of the drawings. Fig. 2 represents the normal positions of the valve and closer and their connected stop devices at the commencement of operation, the curved stop-face 56' being in contact with the straight stop-face 57'' of the stop device 57, so that any tendency of the latter to rock about its pivot will be effectually resisted by the stop device 56. When these faces have passed out of contact, the stop device 57 is free to oscillate, and its curved face 57' will run in contact with the straight stop-face 56'' of the stop device 56, so that any tendency of the latter to retract will be positively checked or limited by the member 57 so long as this relation continues.

Briefly the operation of the hereinbefore-described weighing-machine is as follows:

Fig. 2 represents the positions occupied by the respective operative parts at the commencement of operation, the closers L and L' being locked in the normal position thereof by the latch 17, which engages the rod 160, operatively connected to one of said closers, the valve 31 being open and the chute-walls 18 and 20 being in motion, whereby a stream of material is caused to flow into the empty bucket. When a certain proportion of the load has been received by said bucket, the bucket G and the scale-beam B descend, and the non-counterweighted arm of the lever 38, descending in unison with said scale-beam and falling from under the cam 39, permits the closing of the valve 31 by the counterweight 37' and the consequent reduction and subsequent cut-off of the supply-stream. During this operation the stop device 56 is being swung forward with its curved face 56'' in contact with the pin 51 of the rod 160, so that the oscillation of said rod 160, and hence the opening of the closers L and L', will positively be limited by said stop device 56.

Fig. 3 represents the positions occupied by the parts at the commencement of the poising period, or when the drip or reduced stream is permitted to flow into the bucket to complete the partial load therein, the pin 51 having passed out of contact with the curved face 56'', so that the latch 17 may be tripped. The drip-stream will then flow into the bucket for a limited period of time, and when the load is complete the bucket and the beam will again descend, the non-counterweighted arm of the lever 38 falling farther out of contact with the cam 39. The final closing movement of the valve 31 for cutting off the drip-stream is thereby permitted, and during such final movement the rod 30 will be swung rearward and its pin 33 moved between the walls of the relatively wide portion 35 of the slot 34, the result being a stoppage of the motion of the chute-walls 18 and 20. Concurrently with this last-mentioned movement of the valve 31 the rod 54 will be moved upward and is operable for raising the closer-latch 17, which action frees the two closers L and L' of all restraint, whereby they may be instantly forced open by the weight of the mass of material in the bucket to thereby permit a discharge of the same.

Having described my invention, I claim—

1. The combination with a bucket having two closers united by a toggle, of a rod operative with said closers; a latch for engaging said rod; and means for limiting the action of said rod, should the latch be prematurely tripped during the loading period.

2. The combination of a bucket having two closers united by a toggle; a rod connected to one of said closers; and a latch for engaging said rod.

3. The combination with a bucket having two closers united by a toggle, of a rod operative with said closers; a latch for engaging said rod; and a bucket-supporting scale-beam provided with a device for limiting the action of said rod, should the latch be prematurely tripped during the loading period.

4. The combination with a bucket having a pair of closers, of a valve connected to one of said closers and having a rock-arm; a link connected to said rock-arm and to the other closer; and means for maintaining said closers in their normal positions.

5. The combination of a bucket having two closers united by a toggle, one of which also has a valve; a rod connected to one of said closers; and a latch for engaging said rod.

6. The combination with a chute and with a stream-controlling valve therefor, of a bucket having two closers united by a toggle; and means embodying a latch for holding said closers against opening movement, said latch being operatively connected with the stream-controlling valve.

7. The combination with a valve having a stop device, of a bucket having a closer; a rod operatively connected to said closer; a latch operable for engaging said rod; and a stop device operative with said closer and supported independently of said rod and also coacting with said first-mentioned stop device.

8. The combination with a bucket having two counterweighted closers connected by a toggle, one of which is provided with a valve; a rod also connected to one of said closers; and a latch operable for engaging said swinging rod.

9. The combination with a bucket, of a device operative with the closer and constituting a load-discharge controller; and a scale-beam in operative relation with said bucket, said scale-beam having means for limiting the action of said load-discharge controller.

10. The combination with a bucket having a closer, of closer-supporting means embodying a rod; and a scale-beam for said bucket provided with a stop device for limiting the action of said rod.

11. The combination with a bucket having a closer, of a rod operatively connected to said closer; a latch operable for engaging said rod; and a scale-beam provided with a stop device for limiting the movement of said rod, should the latch be prematurely tripped.

12. The combination with a bucket, of a load-discharge controller; and a scale-beam provided with a flanged stop device, the flange of which is positioned for running in contact with said load-discharge controller during the loading period.

13. The combination with a bucket, of a load-discharge controller; and a scale-beam having a stop device provided with a by-pass, said stop device normally limiting the action of said controller and the latter being operable for tripping said by-pass on its return stroke.

14. The combination with a chute, of a valve therefor provided with a depression in its discharge edge; a drip-valve supported for movement adjacent to said depression; and valve-actuating mechanism.

15. The combination with a chute having a movable wall, of a pulsator for said wall; and a valve controlling the action of said pulsator.

16. In a weighing-machine having a reciprocatory member, the combination with a chute having movable front and rear walls; of means controlled by said reciprocatory member for imparting a pulsatory movement to said walls.

17. In a weighing-machine embodying a reciprocatory member, the combination with a fixed chute having its front wall supported for longitudinal reciprocatory movement and its rear wall for lateral movement, of means controlled by said reciprocatory member for imparting pulsatory movements to said walls.

18. The combination with weighing mechanism, of a chute having a movable wall; a rock-shaft operatively connected to said wall; a valve; and means actuated by the valve for controlling the movement of said rock-shaft.

19. The combination with a chute having a movable wall, of a slotted lever operatively connected to said wall; a valve for the chute; and a driven device having a working stroke between the walls of the slot of said lever, said driven device being controlled by said valve.

20. The combination with a chute having a movable wall, of a valve for said chute; a lever operatively connected to said wall; and a power-shaft having a rod connected thereto and also to said valve, said rod carrying a device for actuating said lever.

21. The combination with a chute having a movable wall and with a stream-controlling valve for said chute, of a power-shaft having a crank; a lever operatively connected to said chute-wall; and a connecting-rod provided with a ring embracing said crank, said rod having a device for actuating said lever and being also joined to the stream-controlling valve.

22. The combination with a chute having a movable wall, of a power-shaft having a crank; a lever connected to said chute-wall, said lever having a slot; and a connecting-rod provided with a ring embracing said crank, said rod being furnished with a pin having a working stroke between the walls of said slot.

23. The combination with a chute having a movable wall, of a lever having a slot of differential widths, said lever being operatively connected to said wall; a driven device having a movement between the walls of said slot and means for operating said driven device.

FRANCIS H. RICHARDS.

Witnesses:
FRED. J. DOLE,
C. S. WEED.